US005281991A

United States Patent [19]

Oonishi et al.

[11] Patent Number: 5,281,991

[45] Date of Patent: Jan. 25, 1994

[54] PAPER FEEDER DRIVEABLE INDEPENDENTLY OF AN IMAGE FORMING APPARATUS

[75] Inventors: Kunihiro Oonishi, Osaka; Eiji Gotou, Higashiosaka, both of Japan

[73] Assignee: Mita Industrial Co. Ltd., Osaka, Japan

[21] Appl. No.: 792,561

[22] Filed: Nov. 15, 1991

[30] Foreign Application Priority Data

Nov. 30, 1990 [JP] Japan .................................. 2-339111

[51] Int. Cl.5 ...................... G03B 29/00; G03G 21/00; B26D 5/20

[52] U.S. Cl. ......................................... 355/29; 83/203; 83/948; 355/310

[58] Field of Search ........................... 355/29, 310, 28; 226/43; 83/63, 203, 948

[56] References Cited

U.S. PATENT DOCUMENTS

| | | | |
|---|---|---|---|
| 3,682,543 | 8/1972 | Iwamoto | 355/310 |
| 3,715,944 | 2/1973 | Knechtel et al. | 83/58 |
| 3,718,394 | 2/1973 | Tysko et al. | 355/310 |
| 3,722,340 | 3/1973 | Kobayashi | 355/29 X |
| 3,922,082 | 11/1975 | Cavallaro et al. | 355/310 |
| 3,944,360 | 3/1976 | Deetz et al. | 355/310 |
| 3,948,130 | 4/1976 | Schroter | 355/310 X |
| 4,383,756 | 5/1983 | Hanamoto et al. | 355/314 |
| 4,706,099 | 11/1987 | Suzuki | 355/311 X |
| 4,712,908 | 12/1987 | Nakayama et al. | 355/243 |
| 5,041,864 | 8/1991 | Saito et al. | 355/29 |
| 5,134,915 | 8/1992 | Fukano et al. | 355/310 X |

FOREIGN PATENT DOCUMENTS

| | | |
|---|---|---|
| 0334327 | 9/1989 | European Pat. Off. . |
| 0429303 | 5/1991 | European Pat. Off. . |
| 1935616 | 2/1971 | Fed. Rep. of Germany . |

*Primary Examiner*—Fred L. Braun

*Attorney, Agent, or Firm*—Jordan and Hamburg

[57] ABSTRACT

A paper feeder is removably attachable to an image forming apparatus and has a display unit. The number of copies displayed on the display unit is incremented when copy paper reaches a specified position in the path of transport. The paper feeder includes a paper feed for transporting the copy paper to the apparatus, a reference distance memory for storing therein a reference distance from a predetermined feed position of the paper feed to the specified position in the apparatus, a device for measuring the length of the copy paper transported from the predetermined feed position, a counter for checking whether the length measured by the measuring device has reached the reference distance and for incrementing the number of paper sheets fed to the apparatus upon the length of transported paper reaching the reference distance, and a display for indicating the number of paper sheets counted by the counter.

7 Claims, 9 Drawing Sheets

PAPER FEEDER DRIVEABLE INDEPENDENTLY OF AN IMAGE FORMING APPARATUS

BACKGROUND OF THE INVENTION AND RELATED ART STATEMENT

The present invention relates to a paper feeder for feeding copy paper to an image forming apparatus wherein the number of copies on display is incremented upon the transport of a sheet of copy paper to a specified position in a path of transport, the paper feeder being adapted to count the sheets with a counter and display the resulting count at the same time as the sheet of copy paper reaches the specified position.

Paper feeders are already known for feeding copy paper to copying machines, printers or like image forming apparatus as an option for use with the apparatus.

Some such paper feeders are not provided with an interface in view of their universal use and are therefore controlled independently of the image forming apparatus for setting or displaying the number of copies.

However, when the paper feeder and the image forming apparatus are individually set to the number of copies to be made for a continual copying operation, the feeder and the apparatus are adapted to increment the number of copies or sheets of copy paper on display, not at the same time, but at different times, so that there is a period during which the feeder and the apparatus display a different number of copies or sheets. It is therefore difficult for the operator to accurately recognize the number of copies produced currently.

SUMMARY OF THE INVENTION

In view of the above situation, an object of the present invention is to provide a paper feeder adapted to display the number of sheets of copy paper fed to an image forming apparatus at the same time as the increment of the number of copies displayed on the apparatus.

The present invention provides a paper feeder removably attachable to an image forming apparatus having a display unit wherein the number of copies on display is incremented upon the copy paper reaching a specified position in a path of transport. The feeder comprises paper feed means for transporting the copy paper to the image forming apparatus, reference distance memory means for storing therein a reference distance from a predetermined feed position of the paper feed means to the specified position in the image forming apparatus, means for measuring the amount of transport of the copy paper from the predetermined feed position, counting means for checking whether the amount of transport measured by the measuring means has reached the reference distance and incrementing the number of paper sheets fed to the image forming apparatus upon the amount of transport reaching the reference distance, and display means for indicating the number of paper sheets counted by the counting means.

With the paper feeder thus constructed, the number of copies displayed on the image forming apparatus is incremented upon the transport of the copy paper to the specified position in the transport path. On the other hand, the amount of transport of the copy paper from the predetermined feed position toward the specified position in the image forming apparatus is measured by the paper feeder, which increments the number of sheets fed on display upon detecting the transport of the paper over the reference distance to the specified position. Accordingly, the number of copies displayed on the image forming apparatus and the number of fed paper sheets displayed on the paper feeder are incremented at the same time. This enables the operator to accurately readily recognize the number of copies produced.

As another feature of the paper feeder, the paper feed means comprises a feed roller, and the measuring means detects the amount of rotation of the feed roller to measure the amount of transport of the copy paper to the image forming apparatus.

With the paper feeder thus constructed, the rotation of the feed roller is detected by a detector of simple construction comprising a rotary disk and a photosensor to measure the amount of transport of the copy paper. This simplifies the construction of the feeder.

As another feature of the paper feeder, the predetermined feed position is the position of a delivery switch for detecting the arrival of the copy paper at a delivery opening.

With the paper feeder thus constructed, the delivery switch serves to detect whether the copy paper has normally reached the delivery opening and also to determine when to start to measure the amount of transport of the copy paper. This simplifies the construciton of the paper feeder.

As another feature of the paper feeder, the paper feed means is provided with cutter means for cutting a continuous strip of paper into sheets of desired length.

With the paper feeder thus constructed, the size of copy paper can be determined as desired.

Still another feature of the paper feeder is that the paper feed means feeds copy paper of a specified size.

With the paper feeder thus constructed, the copy paper can be accommodated therein by a simplified structure.

The above and other objects, features and advantages of the present invention will become more apparent upon a reading of the following detailed description and drawings.

DESCRIPTION OF THE PREFERRED EMBODIMENT

Figure 1:
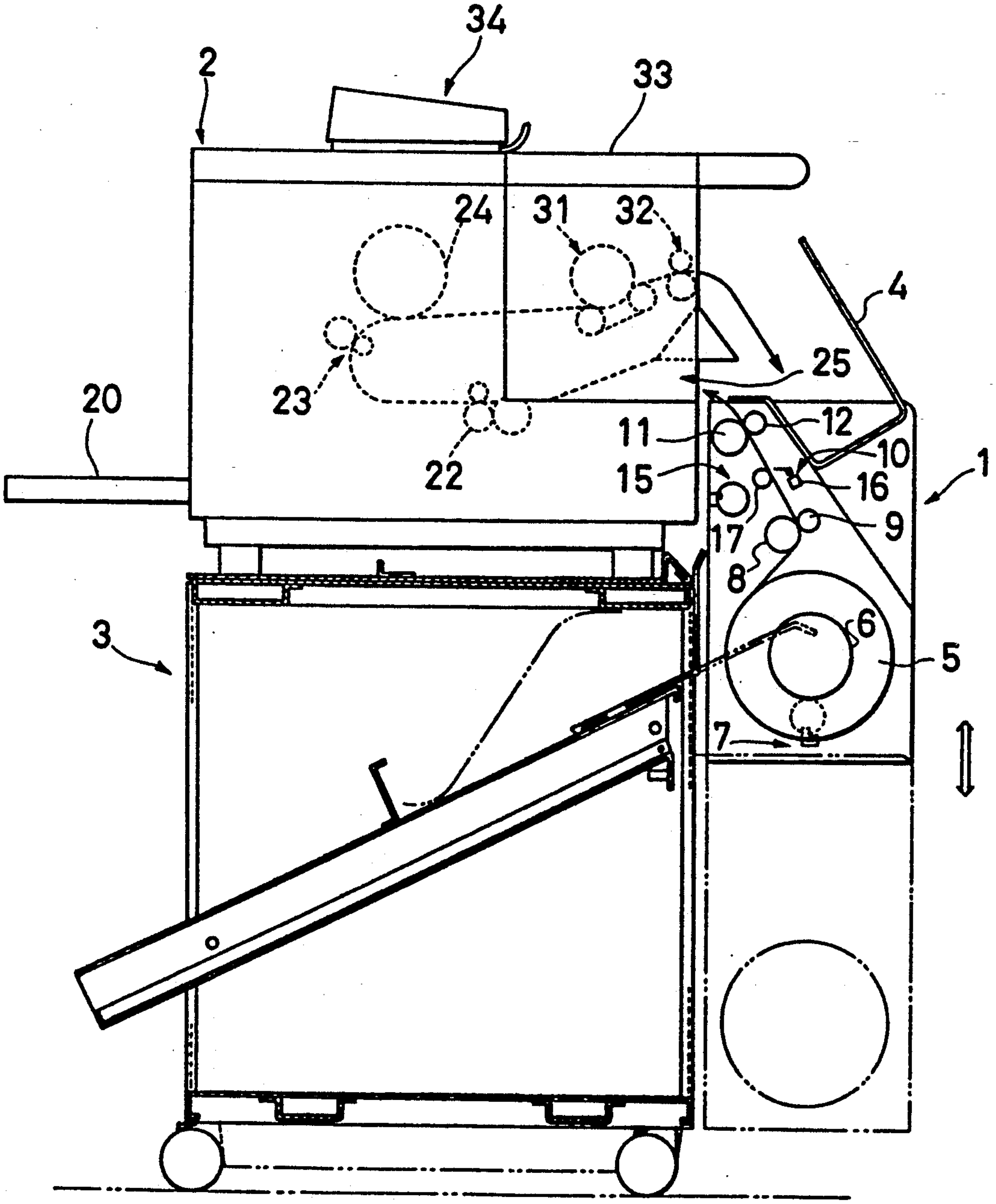
FIG. 1 is an overall construction diagram showing an image forming apparatus, and a paper feeder embodying the invention and attached thereto.

FIG. 1 is a diagram of a paper feeder 1 embodying the present invention and attached to an image forming apparatus (copying machine) 2.

Figure 2:
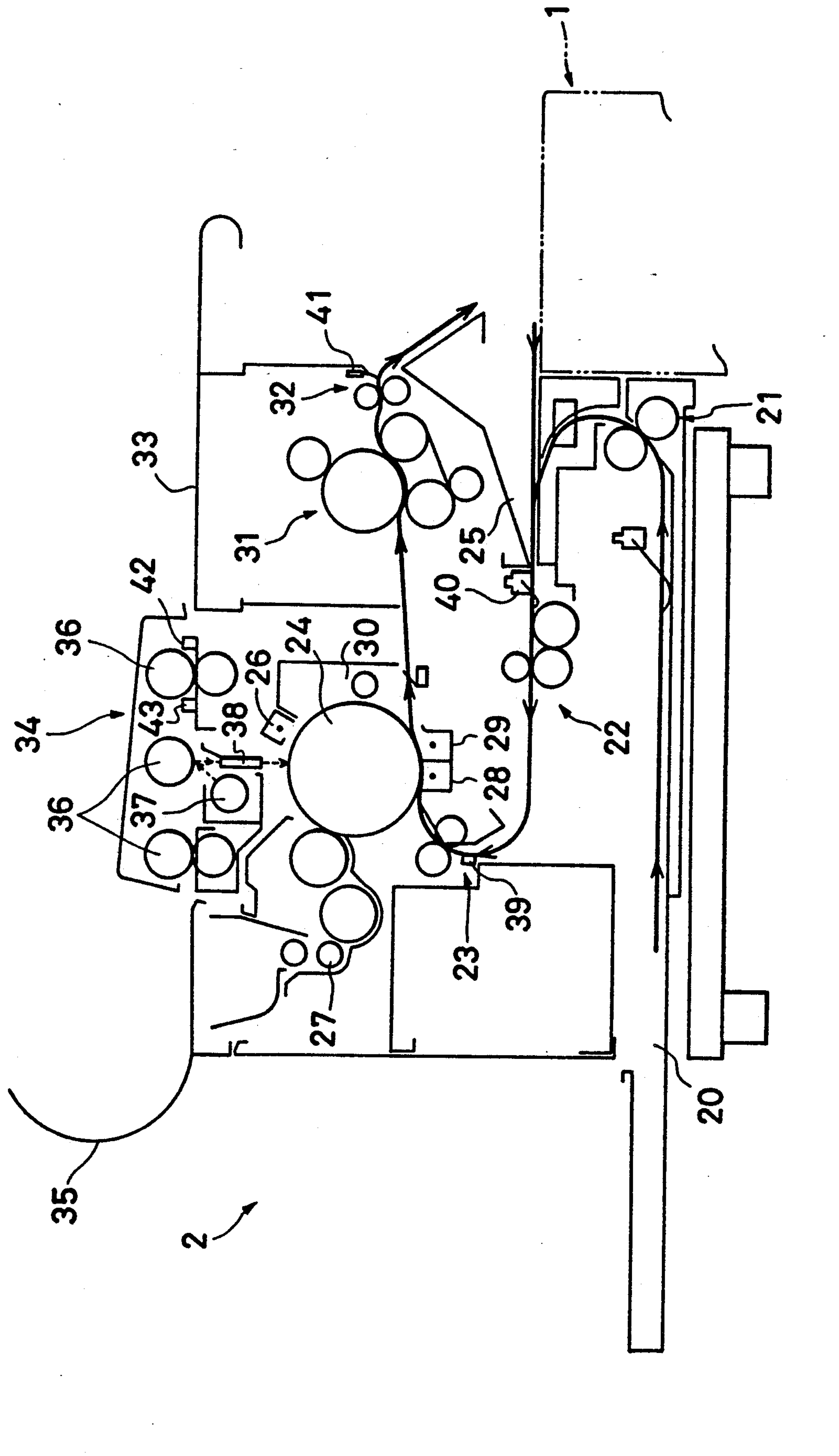
FIG. 2 is a diagram schematically showing the construction of an example of image forming apparatus according to the invention.

The copying machine 2 is supported on a copy paper stock frame 3. As shown in FIG. 2, copy paper is inserted into a paper inlet 25 and fed to a photosensitive drum 24 by way of a pair of feed rollers 22 and a pair of register rollers 23 which are arranged in a path of transport. On the other hand, a paper cassette 20 contains copy paper, which is fed to the drum 24 via a pair of feed rollers 21 and the pair of feed rollers 22.

A sensitizing charger 26, developing unit 27, transfer charger 28, separator 29, cleaner 30, etc. are arranged around the photosensitive drum 24 in the direction of rotation of the drum. A fixing unit 31 and a pair of discharge rollers 32 are arranged downstream from these components with respect to the direction of transport of the copy paper. A document setting portion 33, exposure unit 34 and document inverting member 35 are arranged on the top of the copying machine 2. The exposure unit 34 has a plurality of rollers 36 for transporting documents, a lamp 37, a lens array 38, etc. to expose the document to light. The surface of the, photosen,sitive drum 24 is uniformly charged by the sensitizing charger 26 and then exposed to light by the exposure unit 34 to form an electrostatic latent image thereon. The latent image is developed by the developing unit 27, the developed image is transferred onto copy paper by the transfer charger 28, and the image bearing paper is separated from the drum 24 by the separator 29, has the image fixed thereto by the fixing unit 31 and thereafter discharged from the machine by the pair of discharge rollers 32.

Further provided inside the copying machine 2 are a register switch 39 for detecting the leading end of copy paper, a feed switch 40 for detecting the arrival of the copy paper at the pair of feed rollers 22, and a discharge switch 41 for detecting the discharge of the copy paper. Disposed inside the exposure unit 34 are a document switch 42 for detecting the document inserted thereinto, and a timing switch 43 for starting to read the document as timed with the feed of copy paper.

The paper feeder 1, which is removably attached to the copying machine 2, is movable upward and downward on the front side wall of the paper stock frame 3 along unillustrated rails. As seen in FIG. 1, the feeder 1 is provided at its top with a discharge tray 4 extending obliquely upward to define an opening for stacking up the copies discharged from the copying machine 2.

Figure 3:
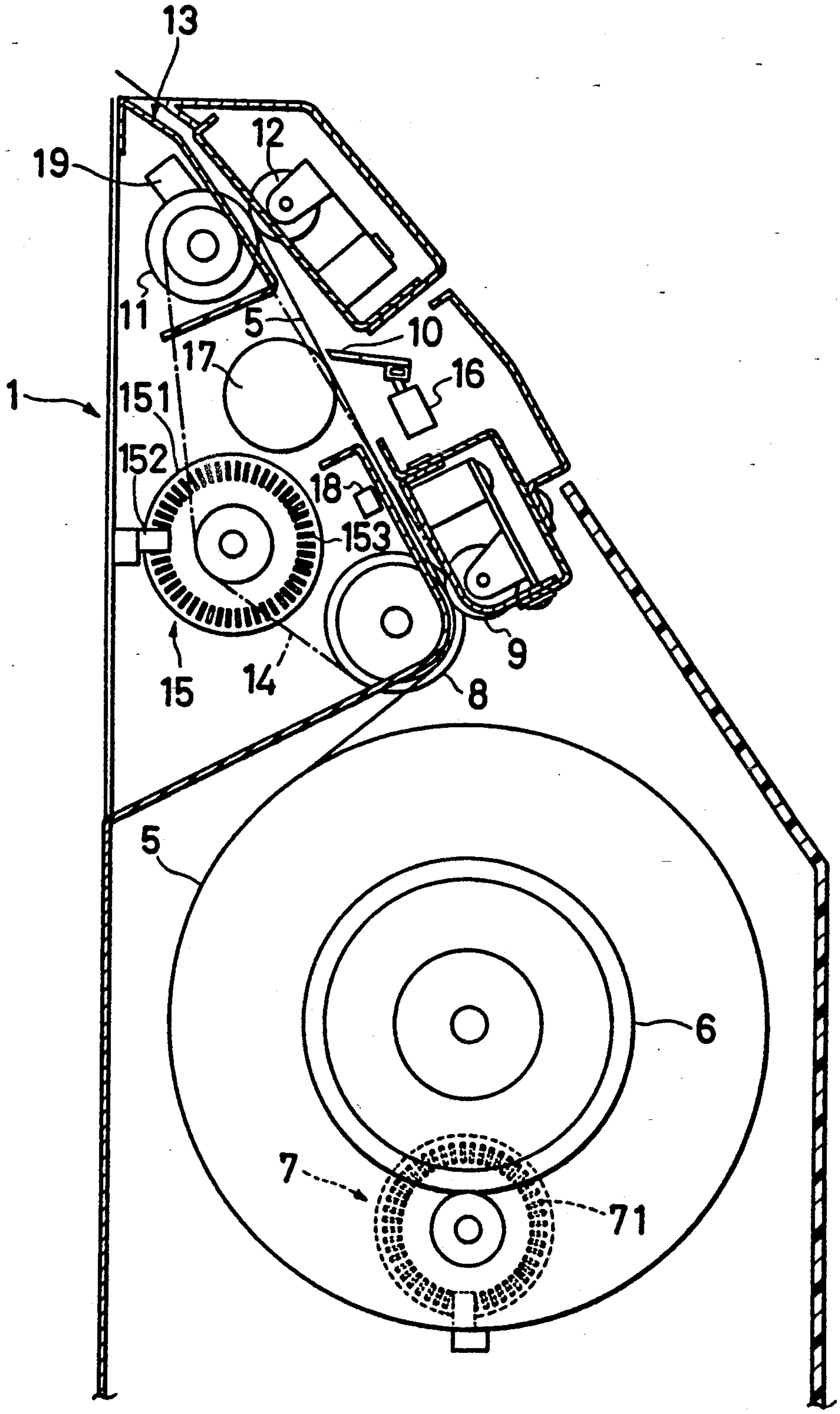
FIG. 3 is a diagram showing the internal construction of the paper feeder of the invention.

The interior construction of the paper feeder 1 will be described with reference to FIG. 3.

A roll of paper (copy paper) 5 is mounted on a roll shaft 6 inside the paper feeder 1. The roll shaft 6 is rotatably supported by the body of the feeder 1. Arranged above the rolled paper 5 are a pair of feed rollers 8, 9, a cutter 10 and a pair of delivery rollers 11, 12, above which a delivery opening 13 is provided. The feed rollers 8, 9 are in pressing contact with each other. The feed roller 8 is coupled to a main motor 51 (to be described) by way of feed clutch 52 and a belt 14 (to be described), and is drivingly rotated when the feed clutch 52 is engaged in response to a control signal from a control unit 54 (to be described ) to transport the rolled paper 5. The belt 14 is coupled to the main motor 51 to drive the feed roller 8, the delivery roller 11 and a rotary disk 151 of a feed detector 15.

The feed detector 15 comprises the rotary disk 151 and a photosensor 152. As mentioned above, the rotary disk 151 is coupled to the main motor 51 by way of the belt 14 and is rotatable with the feed roller 8. The rotary disk 151 is formed with a plurality of pulse apertures 153 arranged at a given spacing circumferentially of the disk. The photosensor 152 is so positioned as to be opposed to the pulse apertures 153 for producing pulses (hereinafter referred to as "feed pulses") in accordance with the rotation of the disk 151, namely, with the amount of rotation of the feed roller 8 by detecting the pulse apertures 153.

The cutter 10 is connected to a solenoid 16. When energized, the solenoid 16 presses the cutter 10 against a roller 17 to cut the rolled paper 5.

The delivery rollers 11, 12 are pressed into contact with each other. As already stated, the delivery roller 11 is driven by the belt 14.

A feed switch 18 is provided for detecting a jam of the rolled paper 5. A delivery switch 19 acts to detect arrival of the rolled paper 5 at the delivery opening 13 when the paper is to be deliverd to the copying machine 2. A remainder sensor 7 is coupled to the roll shaft 6 for detecting the amount of remaining rolled paper 5 by detecting the rotation of the shaft 6 with the feed of the paper.

Figure 4:
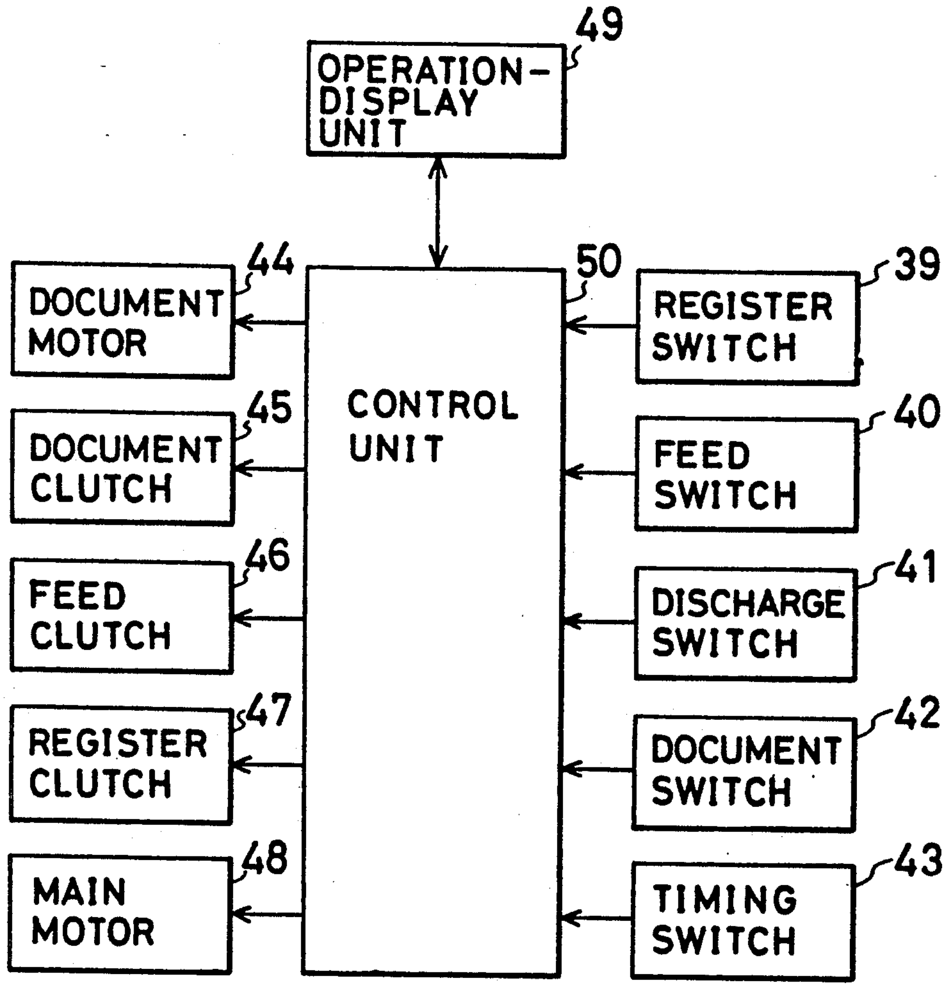
FIG. 4 is a block diagram showing a control system for the image forming apparatus.

The control system of the copying machine 2 will be described with reference to FIG. 4.

A document motor 44 drivingly rotates the rollers 36 of the exposure unit 34. A document clutch 45, when engaged, transmits the torque of the document motor 44 to the rollers 36. A feed clutch 46, when engaged, transmits the torque of a main motor 48 to the pairs of feed rollers 21, 22 to drive these rollers. When engaged, a register clutch 47 transmits the torque of the main motor 48 to the pair of register rollers 23 to drive these rollers. Thus, the main motor 48 drivingly rotates the pairs of feed rollers 21, 22, etc. An operation-display unit 49 has a start key, ten number entry keys and like setting keys and indicators for giving instructions to a control unit 50 and displaying the number of copies, etc. in response to count signals from the control unit 50.

The control unit 50 controls the motors 44, 48, the clutches 45 to 47, etc. in accordance with the outputs from the switches 39 to 43 and the instructions or data given by the operation-display unit 49. The control unit 50 internally has a counter for counting the number of copies. Upon the arrival of the copy paper 5 at the register switch 39 (specified position) after the feed of a document is resumed following the arrival of the leading end of the document at the timing switch 43, the counter is advanced to increment the value thereon, and the resulting count is given in the form of a count signal to the operation-display unit 49.

Figure 5:
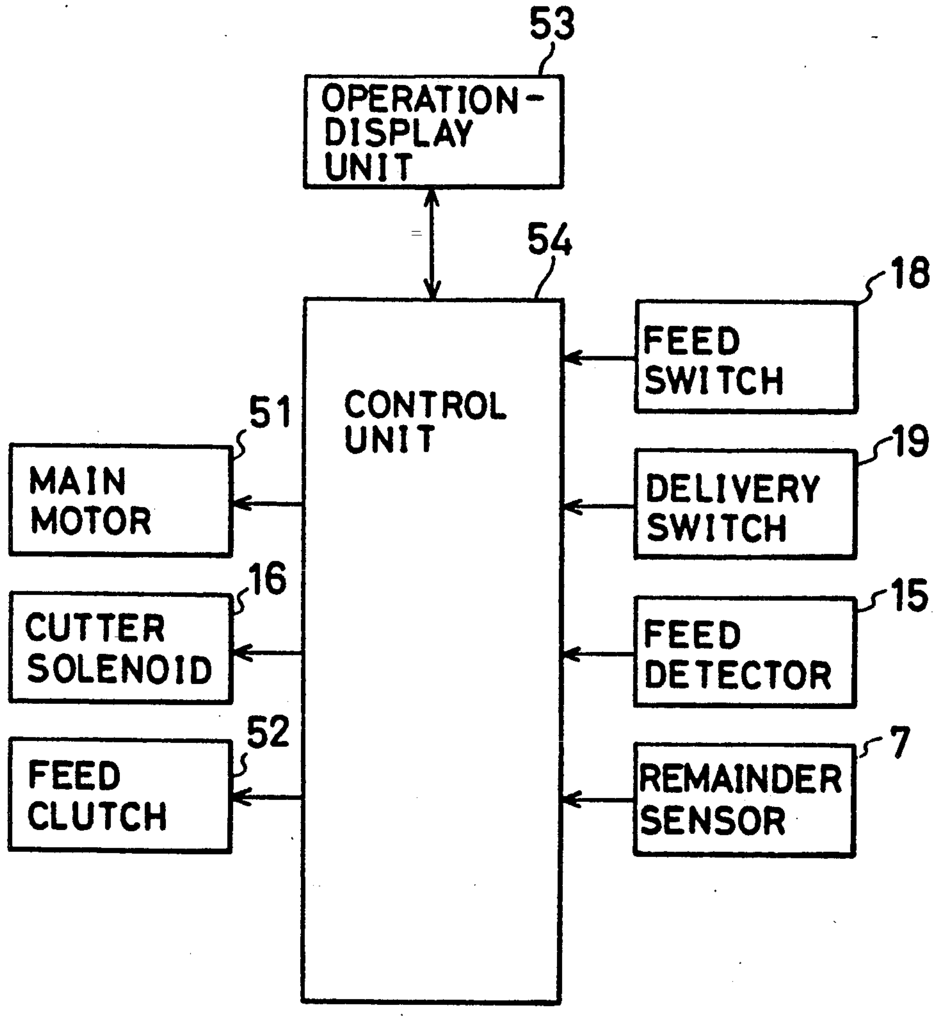
FIG. 5 is a block diagram showing a control system for the paper feeder.

The construction of the control system of the paper feeder 1 will be described next with reference to FIG. 5.

As already described, the main motor 51 causes the belt 14 to rotate the feed roller 8, the delivery roller 11, etc. When engaged, the feed clutch 52 delivers the torque of the main motor 51 to the feed roller 8. When the feed clutch 52 is disengaged, the feed roller 8 is allowed to rotate idly. An operation-display unit 53 has a start key, ten number entry keys and like setting keys and indicators for giving instructions to the control unit 54 and displaying the number of sheets of copy paper fed, etc. in response to count signals from the control unit 54.

The control unit 54 controls the cutter solenoid 16, the motor 51, the feed clutch 52, etc. in accordance with the outputs from the switches 18, 19, the sensor 7 and the feed detector 15 and the instructions or data given by the operation-display unit 53. The control unit 54 further has the function of measuring the feed dimension of rolled paper 5 forwarded by the feed roller 8 (amount of transport) based on the number of feed pulses from the feed detector 15. The control unit 54 is further internally provided with a counter for counting the number of sheets of copy paper 5 fed to the copying machine 2 and feeding the count in the form of a count signal to the operation-display unit 53, and has the function of storing the reference distance from the delivery switch 19 (predetermined feed position) to the register switch 39 (specified position), and the function of incrementing the count value on the counter upon recognizing that the feed dimension of the rolled paper 5 forwarded by the feed roller 8 has reached the reference distance.

Figure 6A:
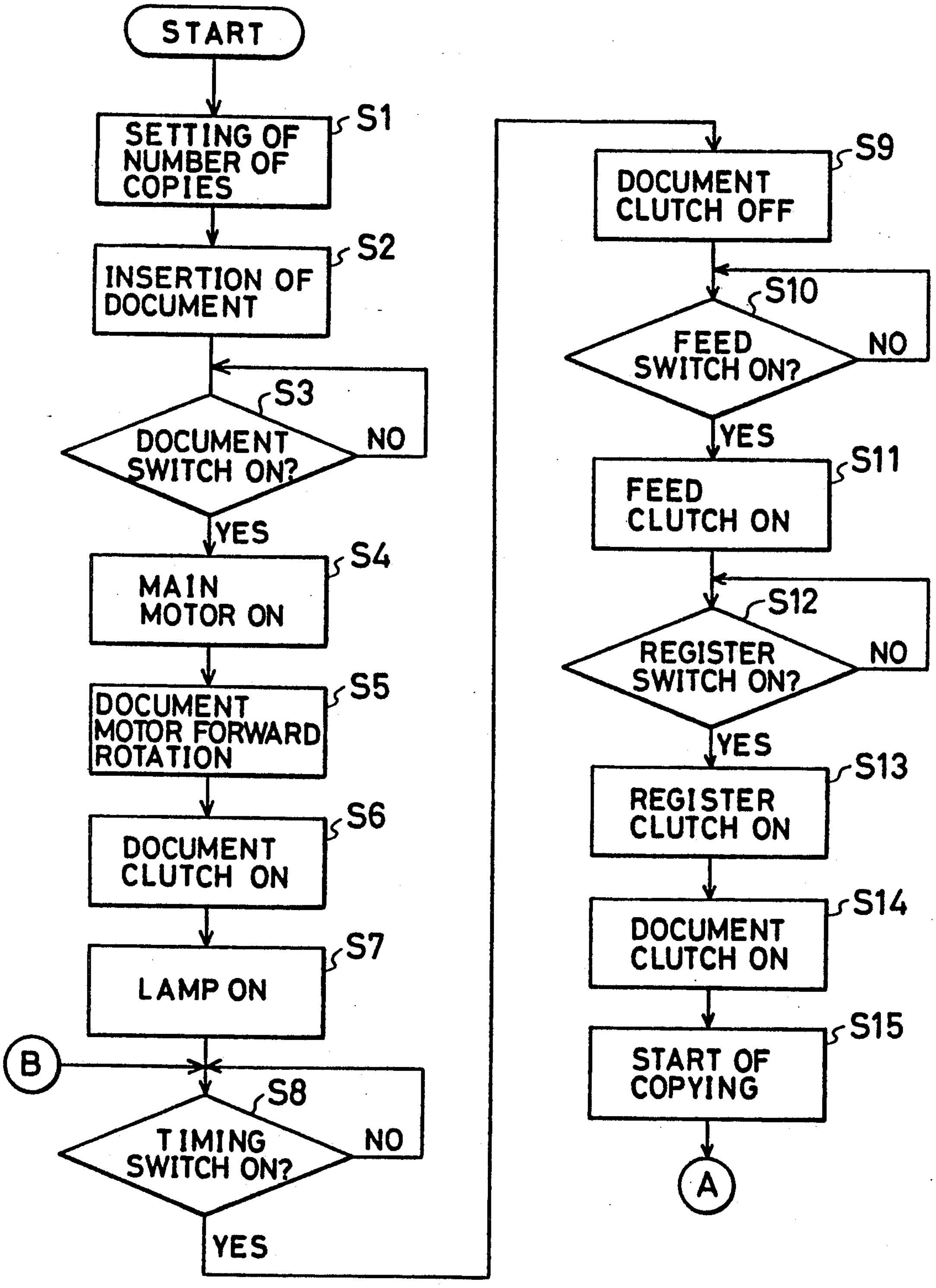
FIGS. 6A and 6B are a flow chart showing the copying operation to be performed by the image forming apparatus according to the invention.
Figure 6B:
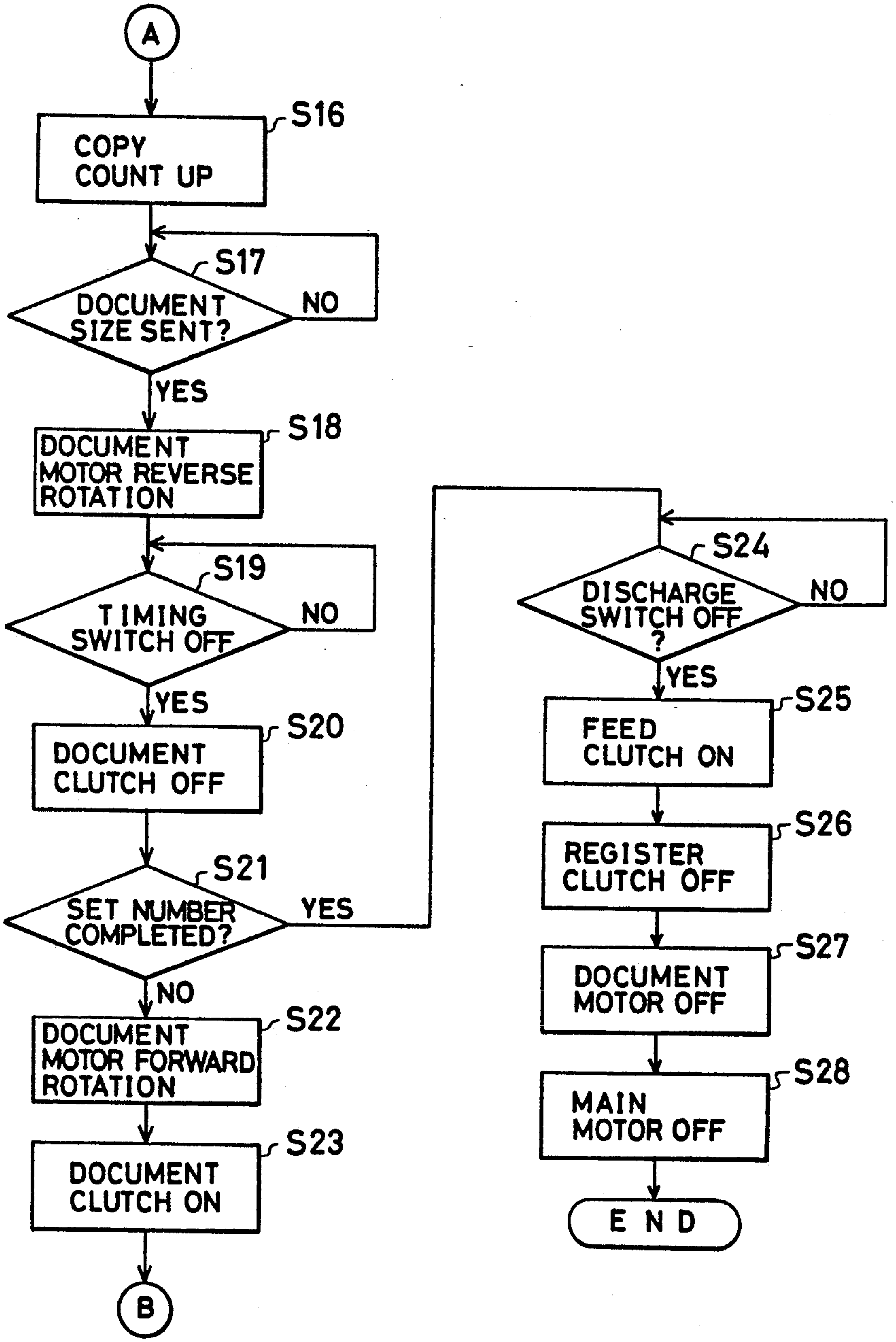

Next with reference to the flow chart of FIGS. 6A and 6B, a copying operation of the copying machine 2 will be described for making a plurality of copies from one document.

The number of copies to be made is set using the operation-display unit 49, and the document is inserted from the document setting portion 33 into the exposure unit 34 (Steps S1, S2) to turn on the document switch 42 (YES in Step S3), whereupon the main motor 48 is turned on in preparation for the start of copying, the document motor 44 is rotated forward, the document clutch 45 is engaged to drive the rollers 36, and the lamp 37 further goes on (Steps S4 to S7).

The document is sent to the timing switch 43, turning on the switch 43 (YES in Step S8), whereupon the document clutch 45 is disengaged to temporarily interrupt the rotation of the rollers 36 (Step S9). A period of waiting time then follows until the feed switch 40 is turned on by copy paper 5 sent out from the paper feeder 1 to the pair of feed rollers 22. Upon the actuation of the feed switch 40 (YES in Step S10),the feed clutch 46 is engaged to drive the pair of feed rollers 22, which in turn transports the paper 5 to the pair of register rollers 23 (Step S11).

When the copy paper 5 is brought to the register rollers 23 to turn on the register switch 39 (YES in Step S12), the register clutch 47 is engaged to drive the register rollers 23, whereby the paper 5 is transported toward the transfer charger 28 for the transfer of an electrostatic image from the photosensitive drum 24 to the paper 5. On the other hand, the document clutch 45 is engaged in timed relation with the register switch 39, driving the rollers 36 to resume the feed of the document and start copying (Steps S13 to S15), whereupon the count of copies is incremented (counted up) to indicate the resulting count on the operation-display unit 49 (Step S16). In the present case, the unit 49 indicates the first copy.

When the document is sent through the exposure unit 34 by an amount corresponding to the document size (YES in Step S17), the document motor 44 is reversely rotated to reversely transport the document to the document setting portion 33 (Step S18). The timing switch 43 is turned off (YES in Step S19), whereupon the document clutch 45 is disengaged to discontinue the rotation of the rollers 36 (Step S20).

Subsequently, an inquiry is made as to whether the set number of copies have been made. If copies still remain to be produced (NO in Step S21), the document motor 44 forwardly rotates again, and the document clutch 45 is engaged, followed by Step S8 to make a copy with the next sheet of copy paper. The count value of copies is incremented (Step S16), and the resulting value is shown on the operation-display unit 49.

When the set number of copies have been made (YES in Step S21), the final copy is discharged, and the paper discharge switch 41 is turned off (YES In Step S24), whereupon the feed clutch 46, the register clutch 47, the document motor 44 and the main motor 48 are all turned off (Steps S25 to S28) to complete the copying operation.

Figure 7A:
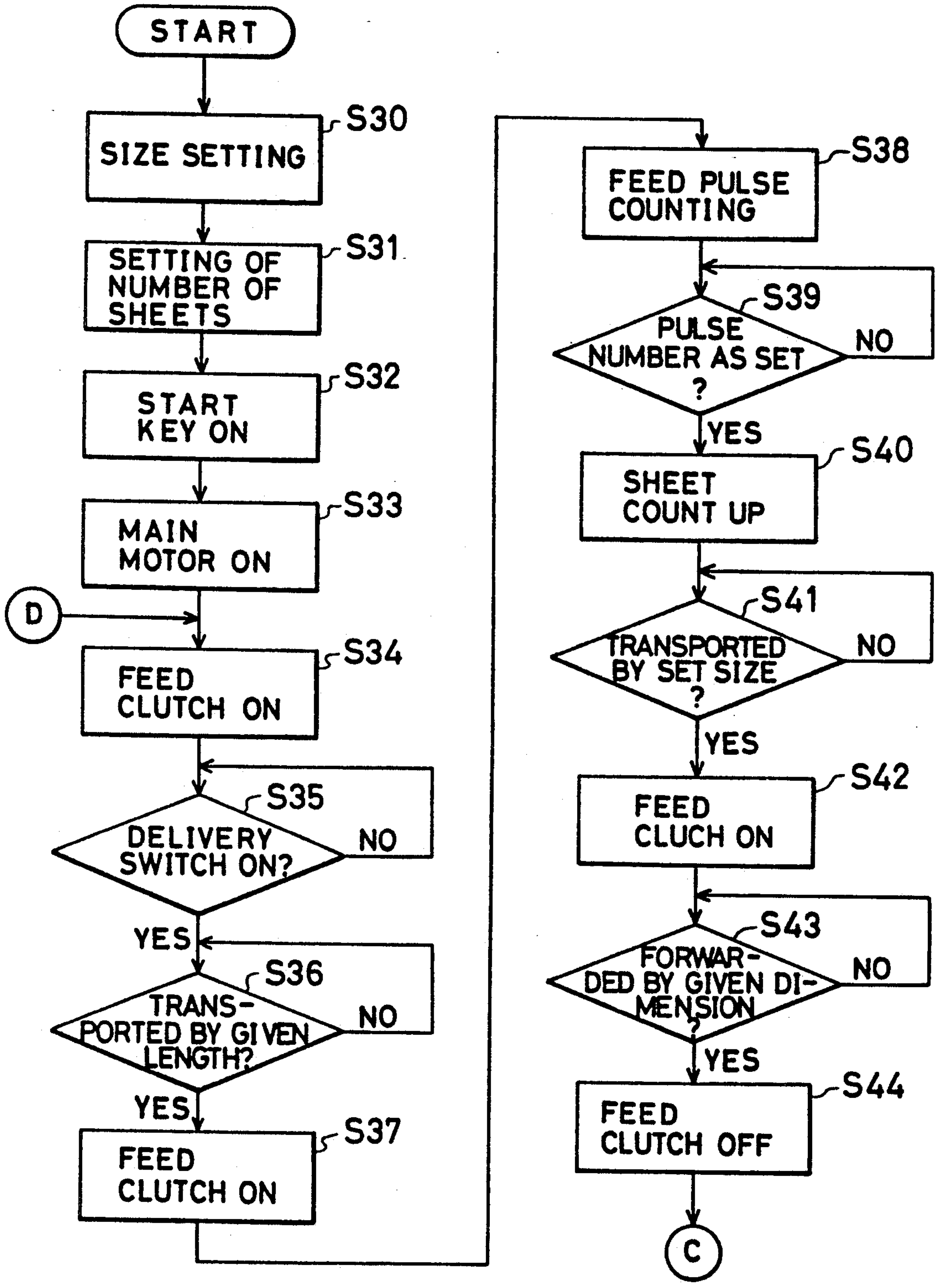
FIGS. 7A and 7B are a flow chart showing the paper feed operation to be conducted by the paper feeder embodying the invention.
Figure 7B:
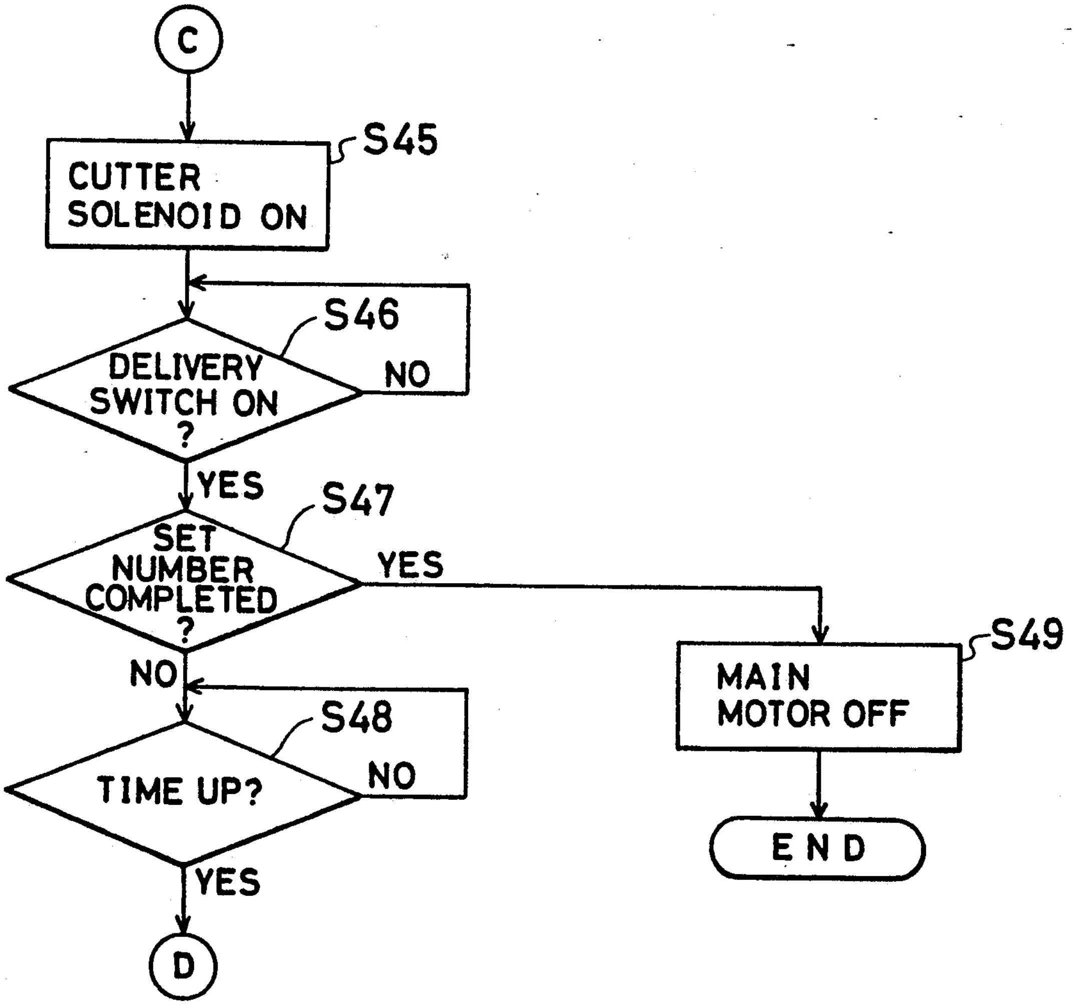

The paper feed operation of the feeder 1 will be described next with reference to the flow chart of FIGS. 7A and 7B.

Using the operation-display unit 53, the operator sets the size to which the rolled paper 5 is to be cut, and the number of sheets of paper to be fed. The start key is thereafter turned on (Steps S30 to S32) to energize the main motor 51 and engage the feed clutch 52 (Steps S33, S34), whereby the feed roller 8 is driven by the belt 14 via the feed clutch 52 to start to transport the rolled paper 5. The leading end of the rolled paper 5 reaches the delivery opening 13, turning on the delivery switch 19 (YES in Step S35). The amount of delivery of the rolled paper 5 delivered by the subsequent rotation of the feed roller 8 (amount of transport) is measured based on the number of feed pulses from the feed detector 15. When the amount of delivery has matched a given length, i.e., the distance from the delivery opening 13 to the pair of feed rollers 22 (YES in Step S36), the feed clutch 52 is disengaged, rendering the feed roller 8 free to rotate idly (Step S37).

On the other hand, upon the arrival of the rolled paper (copy paper) 5 at the pair of feed rollers 22 of the copying machine 2 as stated above, these rollers 22 are driven to forcibly transport the rolled paper 5 to the pair of register rollers 23 (YES in Step S10, Step S11). The transport of the rolled paper 5 idly rotates the feed roller 8, which in turn causes the belt 14 to rotate the rotary disk 151 of the feed detector 15. The detector 15 delivers feed pulses to the control unit 54.

The feed pulses are counted up (Step S38). When the count has increased to a value corresponding to the distance to the register switch 39 of the copying machine 2 (YES in Step S39), that is, when the amount of delivery of the rolled paper 5 has reached the reference distance from the delivery switch 19 (predetermined feed position) to the register switch 39 (specified position), the counter within the control unit 54 is advanced by an increment, and the number of sheets of copy paper on the operation-display unit 53 is accordingly incremented (Step S40). In the present case, the unit 53 indicates the first sheet.

On the other hand, the number of copies displayed on the copying machine 2 is incremented upon the arrival of the rolled paper 5 on the pair of register rollers 23 as previously described (Steps S13 to S15). Thus, the numbers displayed on the feeder 1 and the machine 2 are incremented at the same time.

The feed rollers 22 and the register rollers 23 are thereafter further driven to transport the rolled paper 5 by a predetermined dimension corresponding to the above-mentioned size set for cutting (YES in Step S41), whereupon the feed clutch 52 is engaged (Step S42). The feed roller 8 is driven to forcibly forward the rolled paper 5 by a given dimension (YES in Step 43), whereupon the feed clutch 52 is disengaged. The cutter solenoid 16 is further energized to cut the rolled paper 5 (Steps S44, S45).

Subsequently, the delivery switch 19 is turned off, and the cut-off sheet of paper 5 is delivered from the opening 13 (YES in Step S46), whereupon an inquiry is made as to whether the set number of sheets have been completely fed. If sheets of copy paper still remain to be fed (NO in Step S47), a predetermined period of waiting time follows to ensure feed of paper as timed with copying (YES in Step S48). The sequence then returns to Step S34, followed by the subsequent operation to feed the rolled paper 5 and by the increase of the number of sheets on display by an increment (Step S40).

When the set number of sheets have been completely fed (YES in Step S47), the main motor 51 is turned off (Step S49) to complete the paper feed operation.

With the paper feeder 1 described above, the rolled paper 5 is cut into sheets, which are fed to the copying machine 2. However, the present invention can also be embodied as a paper feeder for feeding sheets of copy paper of specified size.

According to the foregoing description, the specified position in the copying machine 2 is the position of the register switch 39, whereas a switch may be provided at a specified position in the path of transport of the copy paper 5, such that the counter within the control unit 50 is advanced by an increment upon the transport of the copy paper 5 to the switch. On the other hand, the counter within the control unit 54 is advanced by an increment when the copy paper 5 has been delivered by an amount corresponding to the distance from the delivery opening 13 of the paper feeder 1 to the specified position.

Further according to the foregoing description, the predetermined feed position is the position of the delivery switch 19 but is not limited to this position. For example, the position may be the position where the rolled paper 5 is cut by the cutter 10. In this case, the reference distance to be stored in the control unit 54 is altered in accordance with the predetermined feed position.

Although the present invention has been fully described by way of example with reference to the accompanying drawings, it is to be understood that various changes and modifications will be apparent to those skilled in the art. Therefore, unless otherwise such changes and modifications depart from the scope of the invention, they should be construed as being included therein.

What is claimed is:

1. A paper feeder removably attachable as a single unit to an image forming apparatus having a display unit, the number of copies displayed by the display unit being incremented when a copy paper reaches a specified position in a path of transport, said paper feeder comprising, in combination, paper feed means mounted to transport copy paper to the image forming apparatus, a reference distance memory means for storing therein a reference distance from a predetermined feed position of the paper feed means to the specified position in the image forming apparatus means for measuring the length of the copy paper transported from the predetermined feed position, counting means for checking whether the length of transported copy paper measured by the measuring means has reached the reference distance and for incrementing the number of paper sheets fed to the image forming apparatus, when the length of transported copy paper reaches the reference distance, and display means for indicating the number of paper sheets counted by the counting means.

2. A paper feeder as defined in claim 1 wherein the paper feed means comprises a feed roller, and the measuring means is mounted to detect the amount of rotation of the feed roller to measure the length of the copy paper transported to the image forming apparatus.

3. A paper feeder as defined in claim 1 comprising a delivery switch at the predetermined feed position for detecting the arrival of the copy paper at a delivery opening.

4. A paper feeder as defined in claim 1 wherein the paper feed means is provided with cutter means mounted to cut a continuous strip of paper into sheets of desired length.

5. A paper feeder as defined in claim 1 wherein the paper feed means comprises means for feeding copy paper of a specified size.

6. The paper feeder as defined in claim 1 wherein the paper feed means further comprises control means responsive to said length measuring means, memory means and counting means for controlling said paper feed means.

7. The paper feeder as claimed in claim 6, wherein said paper feeder means further comprises a cutting means for cutting said copy paper, said control means being connected to control said cutting means.

* * * * *